Figure 1:
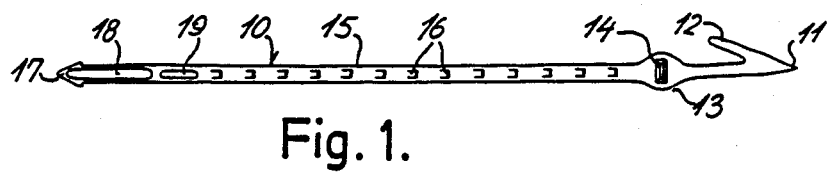

United States Patent [19]

Larsen

[11] Patent Number: 4,901,403
[45] Date of Patent: Feb. 20, 1990

[54] FASTENING MEANS FOR FASTENING A PROTECTIVE SHEET MATERIAL TO A SCAFFOLD OR A SIMILAR FRAME STRUCTURE

[76] Inventor: Bj rn E. H. Larsen, Nylandsvej 6, 400 K ge, Denmark

[21] Appl. No.: 235,889

[22] PCT Filed: Dec. 14, 1987

[86] PCT No.: PCT/DK87/00155

§ 371 Date: Aug. 12, 1988

§ 102(e) Date: Aug. 12, 1988

[87] PCT Pub. No.: WO88/04368

PCT Pub. Date: Jun. 16, 1988

[30] Foreign Application Priority Data

Dec. 12, 1986 [DK] Denmark ............................ 6007/86

[51] Int. Cl.$^4$ ............................................. B65D 63/00
[52] U.S. Cl. .................................. 24/16 PB; 24/17 A; 24/350
[58] Field of Search ................. 24/16 PB, 16 R, 17 A, 24/17 AP, 350, 380, 343, 19, 484, 356; 248/74.3, 231; 256/47; 160/403, 404

[56] References Cited

U.S. PATENT DOCUMENTS

| | | | |
|---|---|---|---|
| 3,013,654 | 12/1961 | Hoff | 24/562 |
| 3,098,271 | 7/1963 | Caveney . | |
| 3,126,601 | 3/1964 | De Marre | 24/350 |
| 3,214,810 | 11/1965 | Mathison | 24/562 |
| 3,255,501 | 6/1966 | Laguerre | 24/16 PB |
| 3,325,853 | 6/1967 | Strowels | 24/16 R |
| 3,365,753 | 1/1968 | Prenner et al. . | |
| 3,779,494 | 12/1973 | Nicholson et al. | 24/343 |
| 3,805,816 | 4/1974 | Nolte . | |
| 3,809,371 | 5/1974 | Martini | 256/47 |
| 3,924,298 | 12/1975 | Merser . | |
| 3,973,610 | 8/1976 | Ballin | 24/16 PB |
| 4,150,463 | 4/1979 | Brown . | |
| 4,447,934 | 5/1989 | Anscher . | |
| 4,510,649 | 4/1985 | Yudis et al. | 24/16 PB |
| 4,705,245 | 11/1987 | Osada | 24/16 PB |

FOREIGN PATENT DOCUMENTS

| | | | |
|---|---|---|---|
| 2326958 | 12/1974 | Fed. Rep. of Germany . | |
| 3011121 | 1/1981 | Fed. Rep. of Germany . | |
| 3049066 | 7/1982 | Fed. Rep. of Germany . | |
| 3204654 | 8/1983 | Fed. Rep. of Germany . | |
| 0301853 | 10/1965 | Netherlands | 24/484 |
| 405131 | 7/1966 | Switzerland | 24/16 PB |
| 1056740 | 1/1967 | United Kingdom | 24/16 PB |
| 2090907A | 7/1982 | United Kingdom . | |

*Primary Examiner*—Victor N. Sakran
*Attorney, Agent, or Firm*—Merchant, Gould, Smith, Edell, Welter & Schmidt

[57] ABSTRACT

A fastening means for fastening a protective or covering sheet material, such as plastic film or textile material, to a scaffold or another frame structure is formed like a strip or band having a film-piercing pointed end and an adjacent barb-like member. The opposite end portion having aplurality of resilient, longitudinally spaced barb-like projections may be passed through an opening or slot in the band-like member. When the sheet material is to be fastened to the scaffold the sheet material is punctured by means of the pointed end. The head formed by the pointed end by the barb-like member is then passed through the opening thus formed in the sheet material. Thereafter the strip member is passed around an adjacent element of the scaffold and inserted through an opening formed in the strip member. The connection thus formed between the sheet material and the scaffold may now be tightened up by pulling the free end of the strip member in the direction indicated by an arrow.

17 Claims, 2 Drawing Sheets

FASTENING MEANS FOR FASTENING A PROTECTIVE SHEET MATERIAL TO A SCAFFOLD OR A SIMILAR FRAME STRUCTURE

The present invention relates to a fastening a protectiveor a covering sheet material, such as a plastic film or a textile material, to a scaffold or a similar frame structure.

When buildings are being renovated or repaired a scaffold is normally built up along the outer walls of the building, and the outer side of the scaffold is may be covered by a reinforced plastic film or a textile or fabric like material. The purpose of such protective sheet material is partly to prevent dust and other foreign matter from spreading to the surrounding area, and party to protect the building and the persons working on the scaffold against bad weather conditions. Up till now, such protective sheet material has normally been fastened to scaffolds by means of an anchor-like fastening means comprising an elongated member having a transverse abutting member at one end and a hook member at the other end. From the scaffold side of the protective sheet material, the abutting member end of the fastening means may then be inserted through a suitably preformed opening in the sheet material so that the abutting member is brought into abutting engagement with the outer surface of the sheet material. The hook member of the fastening means located at the inner side of the protective sheet material may now be fastened to the scaffold by means of a separate rubber band. When the outer walls of a large building is to be covered in this manner, a large number of fastening means and corresponding rubber bands must be used. As the mounting of each fastening means involves several steps, namely preforming an opening in the protective sheet material, insertion of the abutting member of the fastening means through such opening and fastening of the hook member of the fastening means to the scaffold by means of a rubber band, which must be wound around a scaffold member one or more times to obtain a suitable tautness, the conventional method of mounting a protective sheet is rather time consuming.

The present invention provides a fastening means allowing fastening of a protective sheet material to a scaffold or a similar frame structure in a substantially simpler and easier manner.

The fastening means according to the invention is of the above type comprising an elongated member to be inserted through an opening in the protective sheet material and having a transverse member at one end thereof for engaging with the side surface of the sheet material located opposite to the frame structure, the other end portion of the elongated member being adapted to be fastened to the frame structure, and the fastening means according to the invention is characterized in that the elongated member has a sheet penetrating pointed end, the transverse member being a barb-like member arranged at that end.

The fastening means according to the invention renders it possible to fasten a covering sheet material to a scaffold or another frame structure in a very simply manner eliminating the need of performing openings in the sheet material. Thus, from the scaffold's side the protective sheet material may be penetrated by the pointed end of the elongated member and the barb-like member may be inserted through the opening thus formed. The barb-like member may then abuttingly engage with the outer side surface of the sheet material and prevent withdrawal of the fastening means from the sheet material. The other end of the elongated member of the fastening means may thereafter be fastened to an adjacent scaffold element in any suitable manner.

In the preferred embodiment, the elongated member is of the strip fastener type of adjustable length allowing a simple fastening of the elongated member to the scaffolds and subsequent tightening of the fastening means. Such strip fastener be of any conventional type, for example as disclosed in U.S. Pat. Nos. 3,098,271, 3,365,753, 3,924,298, and 4,150,463, German Pat. No. 3,011,121, and German Offenlegungschrift No. 3,049,066. Thus, the elongated member may be a band or a strip member having in one end portion thereof an opening for receiving the other end portion of the strip member, which is provided with barb-like projections for counteracting retraction of said other end from said opening.

The barb-like projections counteracting retraction of said other end portion from the receiving opening may be of any suitable form. As an example they may be in the form of serrations along the side edges of the band or strip member. In a preferred embodiment, however, the barb-like projections are in the form of longitudinally spaced lugs punched from the band or strip member and extending from one of both of the opposite side surfaces of the band or strip member.

In principle, it is possible to form the receiving opening at the end of the elongated member opposite to the pointed end thereof. The band or strip member may then be would around a scaffold element, whereafter the pointed end may be inserted through the receiving opening prior to piercing the sheet material by the pointed end. Thus, the band or strip member is fastened to the scaffold prior to fastening it to the sheet material, and then it is not possible to adjust the tautness of the band or strip member. In a preferred embodiment, however, said end receiving opening is formed adjacent to said pointed end. It is then possible first to insert the pointed end through the protective sheet material and thereafter pass the band or strip member around a scaffold element and insert the free end of the band or strip member through the receiving opening whereafter the tautness of the band or strip member may be adjusted as desired.

The end portion of the elongated member opposite to the pointed end thereof may define a longitudinally extending slot-like opening of a size allowing insertion therein of said pointed end and said barb-like member of a similar fastening means. It is then possible to interconnect two or more fastening means so that they may function as a single combined fastening means. This may be advantageous in cases where the spacing between the protective sheet material and the adjacent scaffold elements substantially exceeds the normal spacing.

Normally, the elongated member of the fastening means and the barb-like member arranged at the pointed end thereof defines a relatively small acute angle therebetween. Therefore, the elongated member may comprise a hinge portion positioned adjacent to the barb-like member and having a hinge axis extending transversely to the plane defined by the elongated member and the barb-like member. Such hinge portion, which may be an integrally formed, easily bendable portion, allows the barb-like member to attain a position in which it extends at substantially right angles to the elongated member so as to better serve as transversed abutment member.

Adjacent edge portions of the barb-like member and the elongated member, respectively, may define an angular space therebetween, said edge portions having serrations or barb means thereon pointing toward the apex of the angular space. Such serrations or barb means may be advantageous when the protective sheet material consists of or includes a net-like structure, because the serrations or barb means may then tend to counteract disengagement between the net structure and the barb-like transverse member when inserted therein.

The fastening means according to the invention may be made in any suitable manner, for example by dies-casting or any other kind or moulding from plastic or rubber material. Alternatively, the fastening means may be made by punching from a plate or sheet material, preferably plastic or another polymer material, including hard rubber. However, the fastening means may also be punched from sheet metal.

Figure 2:
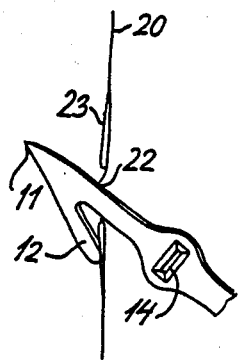
Figure 3:
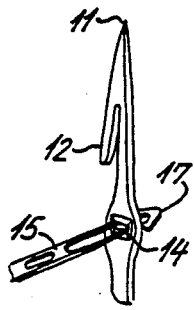
Figure 4:
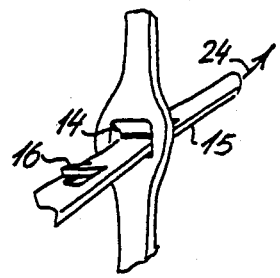
Figure 5:
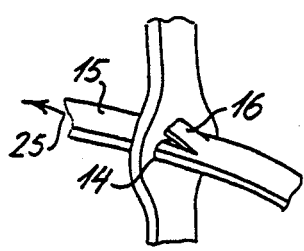
Figure 6:
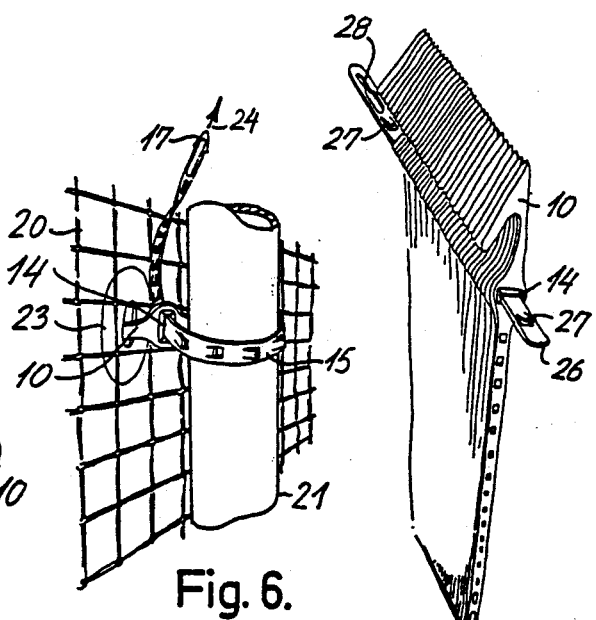
Figure 7:
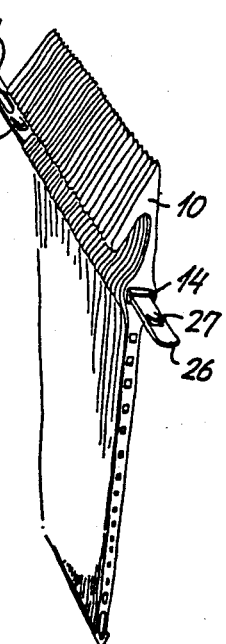
Figure 8:
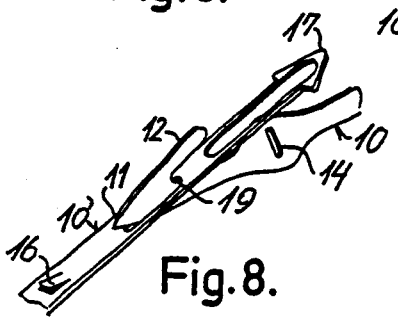
Figure 9:
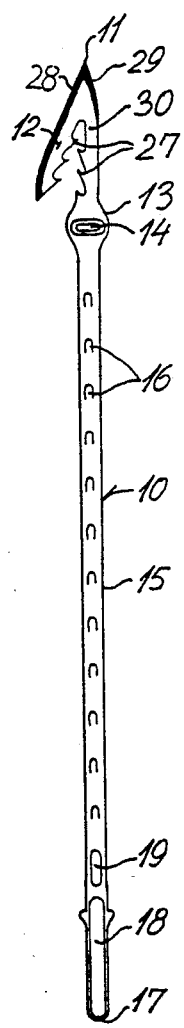
Figure 10:
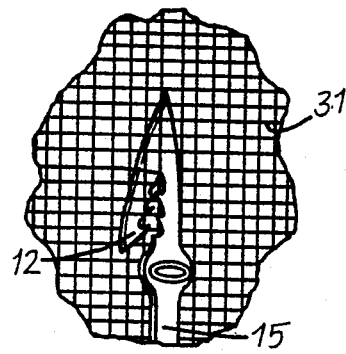
Figure 11:
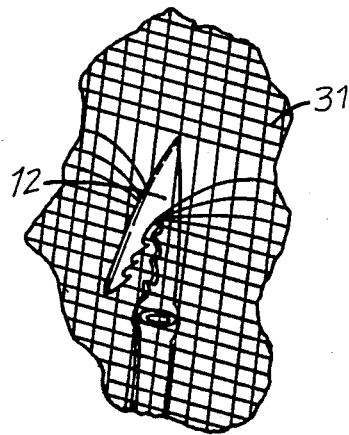
Figure 12:
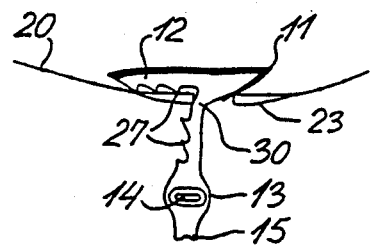

The invention will now be further described with reference to the drawings, wherein FIG. 1 is a side view of a first embodiment of the fastening means according to the invention, FIG. 2 illustrates how a pointed end of the fastening means may be passed through a protective or covering sheet material, FIG. 3 illustrates how the opposite end portion of the strip-like fastening means may be passed through an opening formed adjacent to the pointed end, FIG. 4 illustrates the same as FIG. 3 after passing a further length of the strip member through the receiving opening, FIG. 5 illustrates how barb-like projections on the strip member prevents retraction of the end portion from the receiving opening, FIG. 6 shows how a reinforced plastic film may be fasted to a scaffold element by means of the fastening means according to the invention, FIG. 7 shows how a plurality of fastening means may be arranged on a common carrier strip, FIG. 8 shows how two identical fastening means may be combined to a single fastening means, FIG. 9 is a side view of a second embodiment of the fastening means according to the invention, FIGS. 10 and 11 illustrate how the barb-like transverse member may engage with a netlike structure forming the protective sheet material or being included therein, and FIG. 12 illustrates how the barb-like member may serve as an abutting member.

FIG. 1 shows a strip or band-like fastening means 10 having a sheet penetrating pointed end 11 and an oppositely directed barb-like member 12. A transversely extending narrow opening or slit 14 is formed in a widened part 13. As best shown in FIG. 4, this corresponds to or exceeds the width of an adjacent strip or band-like end portion. This end portion 15 has a plurality of longitudinally spaced, resilient lugs 16 extending from one side surface thereof. In the embodiment shown in the drawings these lugs 16 are punched from the band or strip shaped material and bent so as to form an acute angle with the adjacent side surface of the band-like end portion and so as to point in the direction of the pointed end 11, vide FIGS. 4 and 5. The free end 17 of the strip or bandlike end portion 15 is shaped like an arrow and has a pair of longitudinally extending slits 18 and 19 of different length formed therein.

The fastening means shown in FIG. 1 may be used for fastening a protective or covering sheet material, such as a fibre reinforced plastic film 20, to a scaffold element 21 or the like, vide FIG. 6. Such fastening operation may be as follows:

At first, the plastic film 20 is pierced by means of the pointed end 11, and the head of the fastening means formed by this pointed end and the barb-like member 12 is passed through the opening thus formed in the plastic film. If desired, a reinforcing ring 23 may previously have been mounted so as to encircle the area 22 to be punctured, vide FIG. 2. The barb-like member 12 may thereby be brought into engagement with the outer surface of the film 20, and the band or strip-like end portion 15 may then be passed around the scaffold member 21 as shown in FIG. 6, whereafter the free end 17 is passed through the receiving opening 14 as illustrated in FIG. 3. The connection established between the plastic film and the scaffold member 21 may now be tightened up by pulling the free end 17 in the direction indicated by an arrow 24 in FIG. 4, whereby a certain length of the strip-like end portion 15 is passed through the slit or opening 14. As best shown in FIG. 4 the lugs 16 allow movement of the end portion 15 through the opening 14 in the direction indicated by the arrow 24, because the lugs may resiliently flex inwardly into the plane of the band-like end portion 15. However, the lugs 16 will prevent retraction of the end portion 15 from the opening 14 by movement in the opposite direction indicated by an arrow 25 in FIG. 5, because the lugs will then function like barbs as illustrated in FIG. 5. Thus, as shown in FIG. 6 the connection between the plastic film 20 and the scaffold element 21 may be tightened as desired by pulling the free end 17 of the band or strip member in the direction illustrated by the arrow 24.

In case the film 20 is to be arranged at such a distance from the scaffold element 21 that the length of the fastening means 10 is not sufficient, it is possible to combine two fastening means 10 and 10' so that they may serve as a single combined fastening means as shown in FIG. 8. This may be done by inserting the pointed end 11 and the barb-like member 12 of the fastening means 10 through the slit 19 of the fastening means 10'.

In order to facilitate handling and transporting a plurality of fastening means 10 before they are used they may be kept together by means of a carrier strip 26 which is passed through the openings or slots 14 of the fastening means 10 when arranged side by side, vide FIG. 7. The carrier strip 26 may at each of its opposite ends be provided with a resilient lug 27, which may be of the same type as the resilient lugs 16. These lugs prevent unintentional removal of the fastening means 10 from the carrier strip 26 but allow such removal if a certain resistance provided by the lugs is overcome, or if one of the lugs is manually depressed. It should be understood that the resilient lugs 27 may be replaced by other kinds of resilient projections allowing threading of fastening means 10 onto and removal of fastening means from the carrier strip by overcoming a certain resistance. The carrier strip 26 may have an opening or slot 28 at one end for use in suspending the carrier strip and the fastening means arranged thereon, or for bundling a plurality of such carrier strips with fastening means.

FIG. 9 shows a modified embodiment of the fastening means 10 where the inner edge of the barb-like member 12 and the opposite edge portion of the strip-like member are provided with serrations or barb means 27 pointing in the direction of the pointed end 11. The outer edge 28 of the barb-like member 12 and the adjacent outer edge portion 29 are bevelled so as to form sharp edges, so that the fastening means shown in FIG. 9 has a head like a spear head. The barb-like member 12 is connected to the strip member 15 via a bendable hinge portion 30.

When the fastening means shown in FIG. 9 is used for fastening a sheet material 31, which is formed by or which includes a net-like structure, the serrations or barb means 27 cooperate to secure a safe engagement of the head of the fastening means with the sheet material 31 as illustrated in FIG. 10 and 11. Furthermore, due to the hinge portion 30 the barb-like member 12 may, alternatively, be in abutting engagement with the outer side of the film or sheet material 20 and be moved to a position in which it extends at sustantially right angles to the strip member 15 when the strip member is tightened, vide FIG. 12.

I claim:

1. A fastening means for fastening a protective sheet material to a frame structure such as a scaffold, said fastening means being a substantially flat, integral, strip-like member comprising:
    a pointed sheet-piercing first end to be inserted through the protective sheet material,
    a barb-like member arranged adjacent to the pointed end for engaging with a side surface of the pierced sheet material so as to counteract retraction of the pointed first end when inserted through the sheet material, said barb-like member extending in the substantially same general plane as the flat strip-like member,
    a second opposite end portion, which may be received in an opening defined in the strip-like member so as to form a loop opening a part of the frame structure, and
    means for counteracting withdrawal of said second opposite end from said opening.

2. A fastening means according to claim 1, wherein the means for counteracting withdrawal to said second end portion from the end receiving opening include barb-like projections provided on said second end.

3. A fastening means according to claim 2, wherein the barb-like projections are in the form of longitudinally spaced lugs punched from the strip-like member and extending from at least one of opposite side surfaces thereof.

4. A fastening means according to claim 2, wherein said end receiving opening is defined adjacent to the pointed first end.

5. A fastening means according to claim 1, wherein said second end portion of the strip-like member further defines a longitudinally extending slot-like opening of a size allowing insertion therein of said first pointed end and said barb-like member of another similar fastening means, wherein two such fastening means may be combined so as to form a combined fastening means of an increased length.

6. A fastening means according to claim 1, further comprising a hinge portion interconnecting the barb-like member and the first pointed end and having a hinge axis extending transversely to the common plane of the strip-like member and the barb-like member.

7. A fastening means according to claim 1, wherein adjacent edge portions of the barb-like member and the strip-like member, respectively, define an angular space therebetween, said edge portions having serrations thereon pointing toward an apex of the angular space.

8. A fastening means according to claim 1 which has been punched from a sheet material made from plastic.

9. A fastening means according to claim 1 which has been molded from plastic material.

10. A fastening means for fastening a protective sheet material to a frame structure such as a scaffold, said fastening means being a substantially flat, integral, strip-like member comprising:
    a pointed sheet-piercing first end to be inserted through the protective sheet material,
    a barb-like member arranged adjacent to the pointed end for engaging with a side surface of the pierced sheet material so as to counteract retraction of the pointed first end when inserted through the sheet material, said barb-like member extending in substantially the same general plane as the flat strip-like member,
    a hinge portion interconnecting the barb-like and the first pointed end and having a hinge axis extending transversely to the common plane of the strip-like member and the barb-like member,
    a second opposite end portion, which may be received in an opening defined in the strip-like member so as to form a loop around a part of the frame structure, and
    means for counteracting withdrawal of said second opposite end from said opening.

11. A fastening means according to claim 10, wherein the means for counteracting withdrawal of said second end portion from the end receiving opening include barb-like projections provided on said second end.

12. A fastening means according to claim 11, wherein the barb-like projections are the form of longitudinally spaced lugs punched from the strip-like member and extending from at least one of opposite side surfaces thereof.

13. A fastening means according to claim 11, wherein said end receiving opening is defined adjacent to the pointed first end.

14. A fastening means according to claim 10, wherein said second end portion of the strip-like member further defines a longitudinally extending slot-like opening of a size allowing insertion therein of said first pointed end and said barb-like member of another similar fastening means, wherein two such fastening means may be combined so as to form a combined fastening means of an increased length.

15. A fastening means according to claim 10, wherein adjacent edge portions of the barb-like member and the strip-like member, respectively, define an angular space therebetween, said edge portions having serrations thereon pointing toward an apex of the angular space.

16. A fastening means according to claim 10 which has been punched from a sheet material made from plastic.

17. A fastening means according to claim 10, which has been molded from plastic material.

* * * * *

UNITED STATES PATENT AND TRADEMARK OFFICE
CERTIFICATE OF CORRECTION

PATENT NO. : 4,901,403

DATED : 20 February 1990

INVENTOR(S) : Bjorn E. H. Larsen

It is certified that error appears in the above-identified patent and that said Letters Patent is hereby corrected as shown below:

Front page, Inventor, "Bj rn" should be --Bjorn-- and "K ge" should be --Koge--

Abstract, line 6, "aplurality" should be --a plurality--

Col. 1, line 6, after "fastening" insert --means for fastening--

Col. 1, line 7 "tiveor" should be --tive or--

Col. 1, line 62, "simply" should be --simple--

Col. 2, line 1, "sheet material" should be --fastening means--

Col. 2, line 27, "of" (1st) should be --or--

Col. 2, line 32, "would" should be --wound--

Col. 3, line 1, "transversed" should be --transverse--

Col. 3, line 15, "dies" should be --die--

Col. 3, line 49, "netlike" should be --net-like--

Col. 3, line 58, after "this" insert --narrow opening may have a funnel-shaped entrance, and the length of the opening 14--

Signed and Sealed this

Sixteenth Day of April, 1991

Attest:

HARRY F. MANBECK, JR.

*Attesting Officer*     *Commissioner of Patents and Trademarks*